(12) United States Patent
Hunold

(10) Patent No.: US 6,487,923 B1
(45) Date of Patent: Dec. 3, 2002

(54) BOAT TRANSMISSION

(75) Inventor: Bernard Hunold, Friedrichshafen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 09/763,042

(22) PCT Filed: Aug. 28, 1999

(86) PCT No.: PCT/EP99/06354

§ 371 (c)(1),
(2), (4) Date: Feb. 15, 2001

(87) PCT Pub. No.: WO00/13970

PCT Pub. Date: Mar. 16, 2000

(30) Foreign Application Priority Data

Sep. 3, 1998 (DE) .......................... 198 40 084

(51) Int. Cl.⁷ .................................. F16H 3/08
(52) U.S. Cl. ............................ 74/331; 74/329
(58) Field of Search .................. 74/325, 329, 331, 74/665 GD, 373

(56) References Cited

U.S. PATENT DOCUMENTS

| 2,741,351 A | | 4/1956 | Fletcher et al. ................. 192/4 |
| 2,785,582 A | | 3/1957 | Banker ......................... 74/472 |
| 3,648,546 A | | 3/1972 | McNamara et al. .......... 74/333 |
| 3,682,015 A | * | 8/1972 | Richardson .................. 74/377 |
| 3,885,446 A | * | 5/1975 | Pengilly ....................... 74/331 |
| 3,952,606 A | * | 4/1976 | Schulz ......................... 74/329 |
| 4,481,836 A | * | 11/1984 | Richards ...................... 74/331 |
| 4,539,856 A | | 9/1985 | Frost ........................... 74/363 |
| 4,831,894 A | | 5/1989 | Braun .......................... 74/745 |
| 5,711,742 A | | 1/1998 | Leinonen et al. ........... 477/121 |

FOREIGN PATENT DOCUMENTS

| DE | 2 215 881 | | 10/1973 |
| DE | 25 44 338 | | 4/1977 |
| DE | 30 18 610 A1 | | 12/1981 |
| DE | 31 02 556 A1 | | 8/1982 |
| DE | 31 09 873 A1 | | 10/1982 |
| DE | 31 33 067 A1 | | 3/1983 |
| DE | 31 44 586 A1 | | 5/1983 |
| DE | 37 36 838 A1 | | 5/1989 |
| DE | 43 11 083 C1 | | 7/1994 |
| DE | 196 24 913 A1 | | 1/1997 |
| EP | 0 088 499 A1 | | 9/1983 |
| IT | 487343 | * | 11/1953 | .................. 74/331 |

* cited by examiner

Primary Examiner—Charles A Marmor
Assistant Examiner—Ha Ho
(74) Attorney, Agent, or Firm—Davis & Bujold, P.L.L.C.

(57) ABSTRACT

The multi-speed boat transmission for propulsion systems having a basic transmission for transmitting the motor power to a fixed propeller or water jet has, in addition to a preferably single-speed basic transmission (2), a separate front-mounted transmission (1) for flange-mounting to the basic transmission (2) and stepping-up parts (7, 8, 12), the countershafts (5) being distributed around the periphery of the main shaft (10) of the basic transmission in a manner such that no additional forces act upon the main shaft (10).

20 Claims, 4 Drawing Sheets

BOAT TRANSMISSION

FIELD OF THE INVENTION

The invention relates to a multi-speed boat transmission.

BACKGROUND OF THE INVENTION

In conventional, boat transmissions, a fixed propeller is driven by a motor via a transmission having a constant ratio. The consequence of this construction is that the propulsion system can be optimally coordinated only for one operating point.

However, there are often situations in which such constructions have an unfavorable effect: when, e.g. the propulsion system is designed for a final speed as high as possible, the motor is pressed relative to the rotational speed when the boat resistance is increased as a result of weather conditions, cargo, etc. whereby only one part of the total power of the motor is available. Besides, the acceleration properties are poor and the thermal load of the motor is high. This also results in the production of soot.

On the other hand, if the propulsion system is designed for an acceleration as high as possible or for driving with elevated resistance, the nominal rotational speed of the motor under normal conditions is achieved without delivering full power in the process. This has a negative effect on the final speed obtainable.

It thus becomes necessary to optimize the propulsion device so that it is adaptable to different conditions of operation whereby the motor can always work in an optimal rotational speed range.

To that end, a variable-pitch propeller has been proposed. But this solution mechanically requires much expenditure and, consequently, is expensive and unusual in yachts/speed boats. A variable-pitch propeller also has poor efficiency.

SUMMARY OF THE INVENTION

DE 196 24 913 A1 discloses a marine propeller system having one motor, one shifting mechanism and one programmable electronic control device with a shifting parameter matrix. The electronic control device monitors the motor load and the revolution rate and produces a control signal which controls the shifting operations. Since this system forms one unit, it is not possible to change over already existing transmissions of the conventional kind mentioned above. On the contrary, new transmissions must be developed according to those requirements.

DE 31 02 556 A1 discloses a two-step transmission for boat propeller systems in which a planetary transmission is used. This transmission has a direct gear with a 1:1 ratio shiftable by a friction clutch for the cruising drive, while for a drive at highest speed a high speed gear is provided which is formed by the planetary transmission and a hydraulic clutch, and gears up the rotational speed.

With this construction, it is not possible to implement any small speed ratio changes for the high-speed range: likewise a simple change of the ratio is not possible. Furthermore, losses occur in the highest speed range.

Therefore, the problem on which this invention is based is to make a power shiftable boat transmission available which, in combination with a fixed propeller or water jet, allows a variable adaptation to different operating conditions.

Accordingly, on an already existing basic transmission, it is proposed to flange mount a separate front-mounted transmission having at least two countershafts wherein the countershafts are distributed around the periphery of the main shaft of the basic transmission in a manner such that no additional forces act upon the main shaft. The front-mounted transmission can be flange mounted on different transmission designs of boat propelling families without having to develop entirely new transmissions, therefore, the possible uses are multiple.

In addition, the front-mounted transmission is modularly built so that it can be coordinated by adapting a few parts to different operating conditions without having to develop new transmissions.

Besides, the stepping-up parts are configured in such a way that, via a provided plug-in system, it is possible to prepare both a gear up and a gear down ratio, with identical parts, but by a different assembly. Moreover, by varying the number of individual stepping-up parts teeth, different ratio ranges can be implemented. Moreover, by varying the number of individual stepping-up parts teeth, different ratio ranges can be implemented.

All this requires only a small assembly expenditure wherein almost arbitrary ratios can be implemented and, in particular, small ratio changes are also possible, unlike in a planetary transmission.

The construction proposed is of reasonable cost, since in most cases only a different assembly of identical parts is needed. It also offers a high measure of flexibility in regard to different requirements.

BRIEF DESCRIPTION OF THE DRAWINGS

The invention is explained in detail with the aid of the drawings which show:

FIG. 1a makes clear the need to adapt a boat propulsion system to different operating conditions:

DESCRIPTION OF THE PREFERRED EMBODIMENTS

If the propulsion system has been laid out for the highest possible final speed, the optimal operating point A, at a correspondingly high motor rotational speed n, is in the proximity of the nominal rotational speed $n\_max$, which, in turn, results in a high generated power P in the proximity of the maximum power $P\_max$. Under great boat resistance resulting from weather conditions, cargo, etc., the motor is pressed relative to the rotational speed and the optimum operating point cannot be reached. The new operating point A' stands out by the fact that only a part of the total power of the motor is available. Besides, the acceleration property is poor and the thermal load of the motor high. This also results in the production of soot.

Figure 1A:
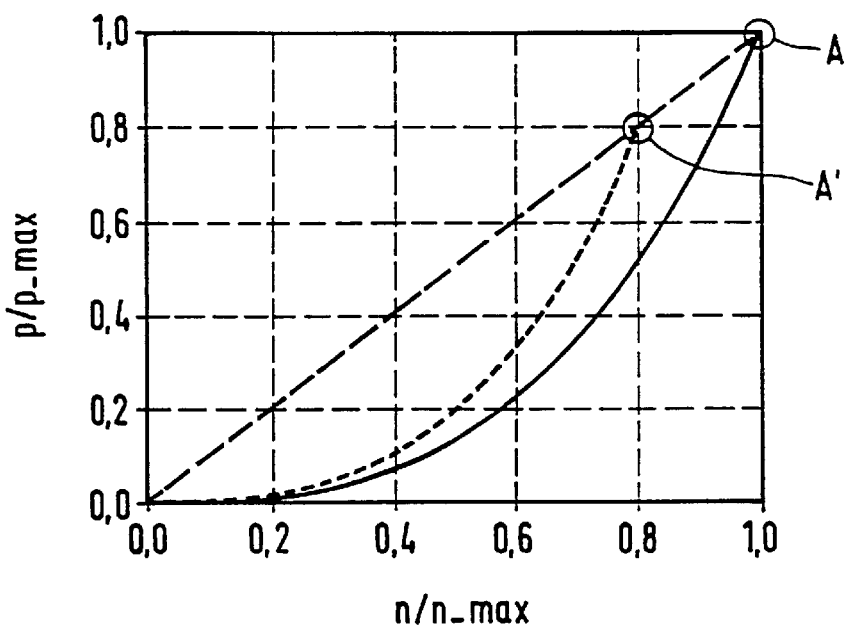
FIG. 1a is a power-rotational speed diagram of a conventional boat propeller designed for high final speed.
Figure 1B:
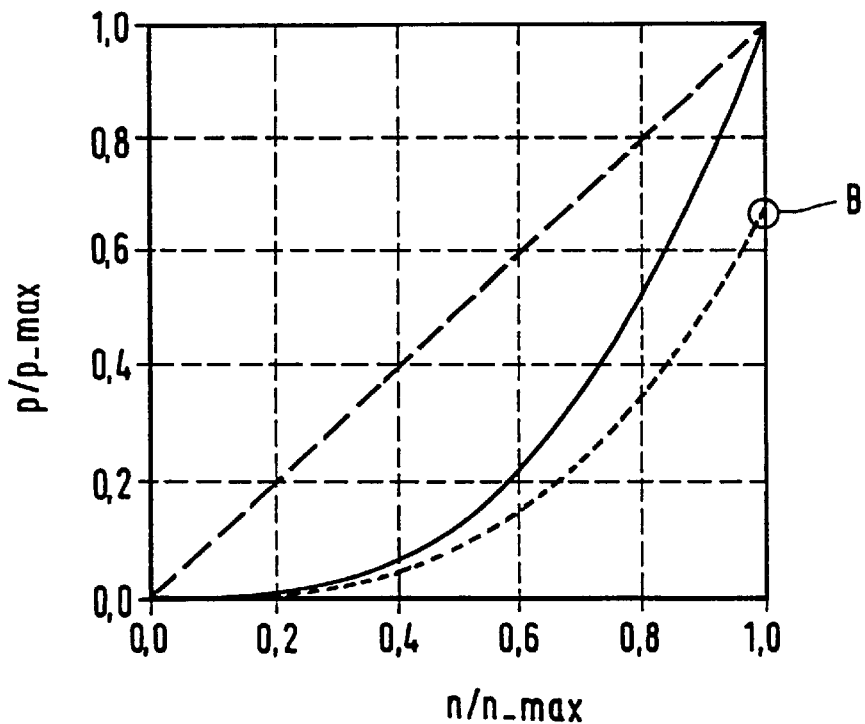
FIG. 1b is a power-rotational speed diagram of a conventional boat propeller designed for high acceleration.

FIG. 1b illustrates another typical unfavorable situation: in the case shown, the propulsion system is laid out for high acceleration or high boat resistance. Thereby under normal conditions, the motor reaches the nominal rotational speed n__max at the operating point B without generating the full power P__max.

Figure 2:
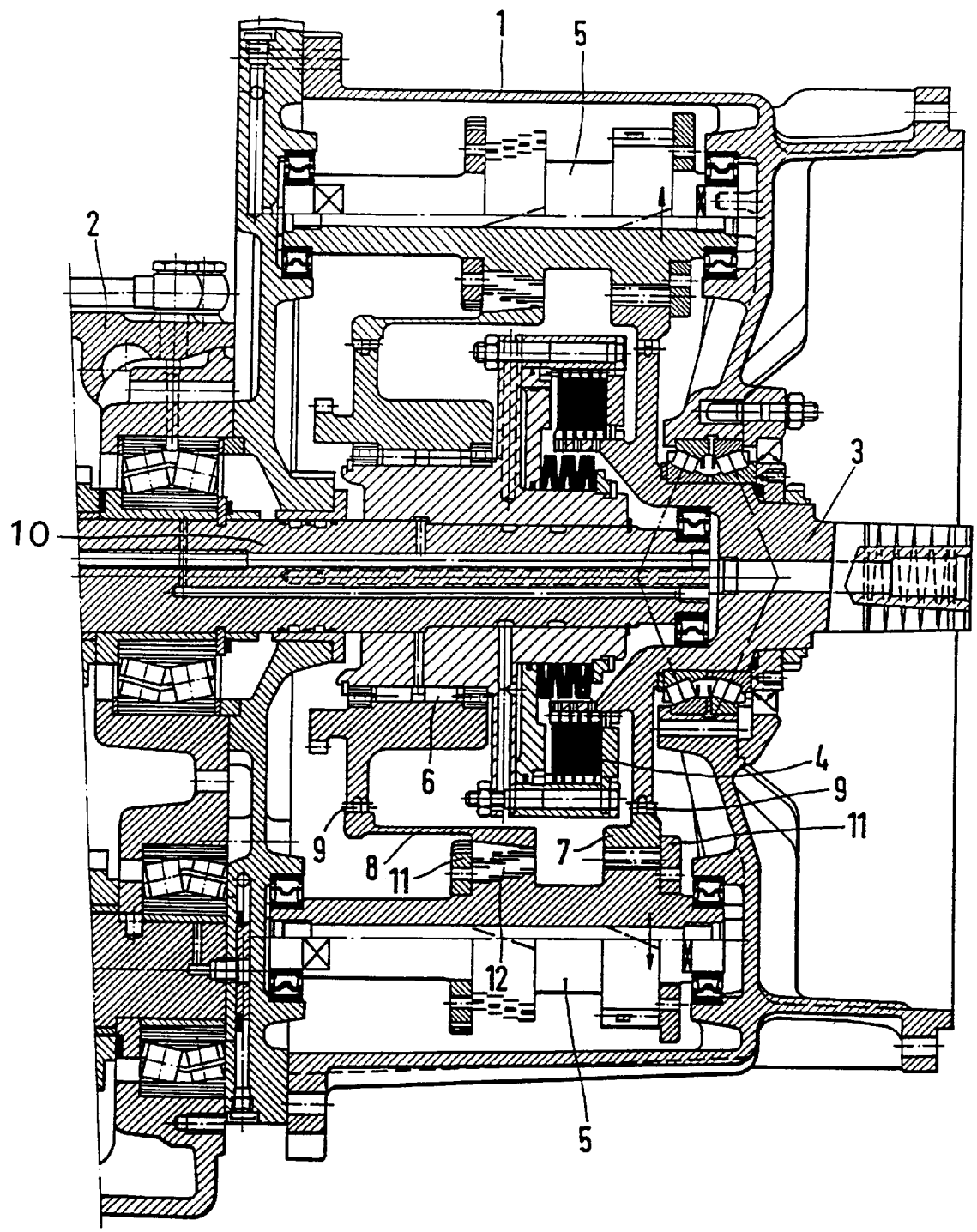
FIG. 2 is a cross-sectional representation of the front-mounted transmission according to a first variant of the instant invention.

According to FIG. 2, a front-mounted transmission is flange-mounted on a basic transmission 2. The motor drives a shaft 3. According to the invention, it is possible, via a clutch 4, to completely shift directly to the basic transmission, the ratio amounting to 1:1 or alternatively to select one other ratio i by means of both countershafts 5. The ratio is activated by means of one other clutch or of one free wheel unit 6. By virtue of the free wheel unit, the load is mechanically taken up automatically.

By virtue of the construction described here as a front-mounted transmission with power distribution over two symmetrically opposite countershafts 5, no added forces act upon the basic transmission 2, since the supporting forces of the main shaft 10 have been removed. No changes of the housing or of the support are therefore needed.

Within the scope of this special advantageous embodiment of the instant invention, helical-cut teeth are provided for noise reasons. In this case, in order to keep the main shaft 10 free of additional forces, pressure cams 11 are provided which assist generating axial forces of the main shaft wheels.

Between the gear ring of the helical-cut toothing 12 of the countershafts 5 and the main shaft 10, a flexible annular connecting element 8 is provided of which one end meshes with the gear ring and the other end is connected with the main shaft 10, a flexible area being provided between the two ends. The flexible area preferably has a reduced wall thickness.

By adequate selection of the stepping-up parts 7 and 8, an optional gradation of the gears is possible so that an optimal coordination between motor and transmission can be obtained: to implement one other ratio, only toothing parts 12 have to be exchanged.

In addition, the stepping-up parts of the inventive front-mounted transmission are designed so that it is possible to obtain a ratio 1/i reciprocal with the initial ratio i via a provided plug-in system 9 by a different assemblage with identical parts.

Figure 3:
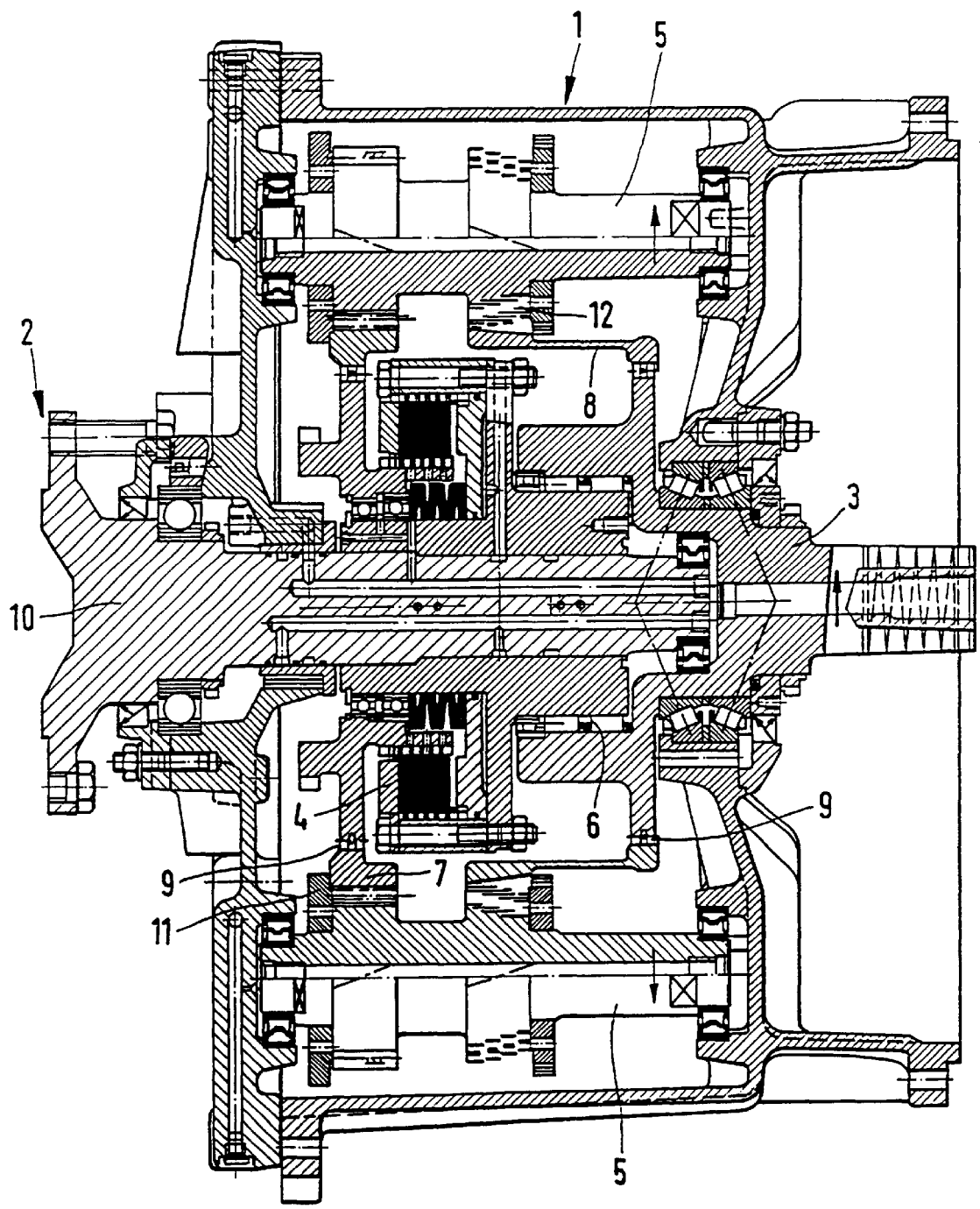
FIG. 3 is a cross-sectional representation of the front-mounted transmission according to a second variant of the instant invention.
Figure 4:
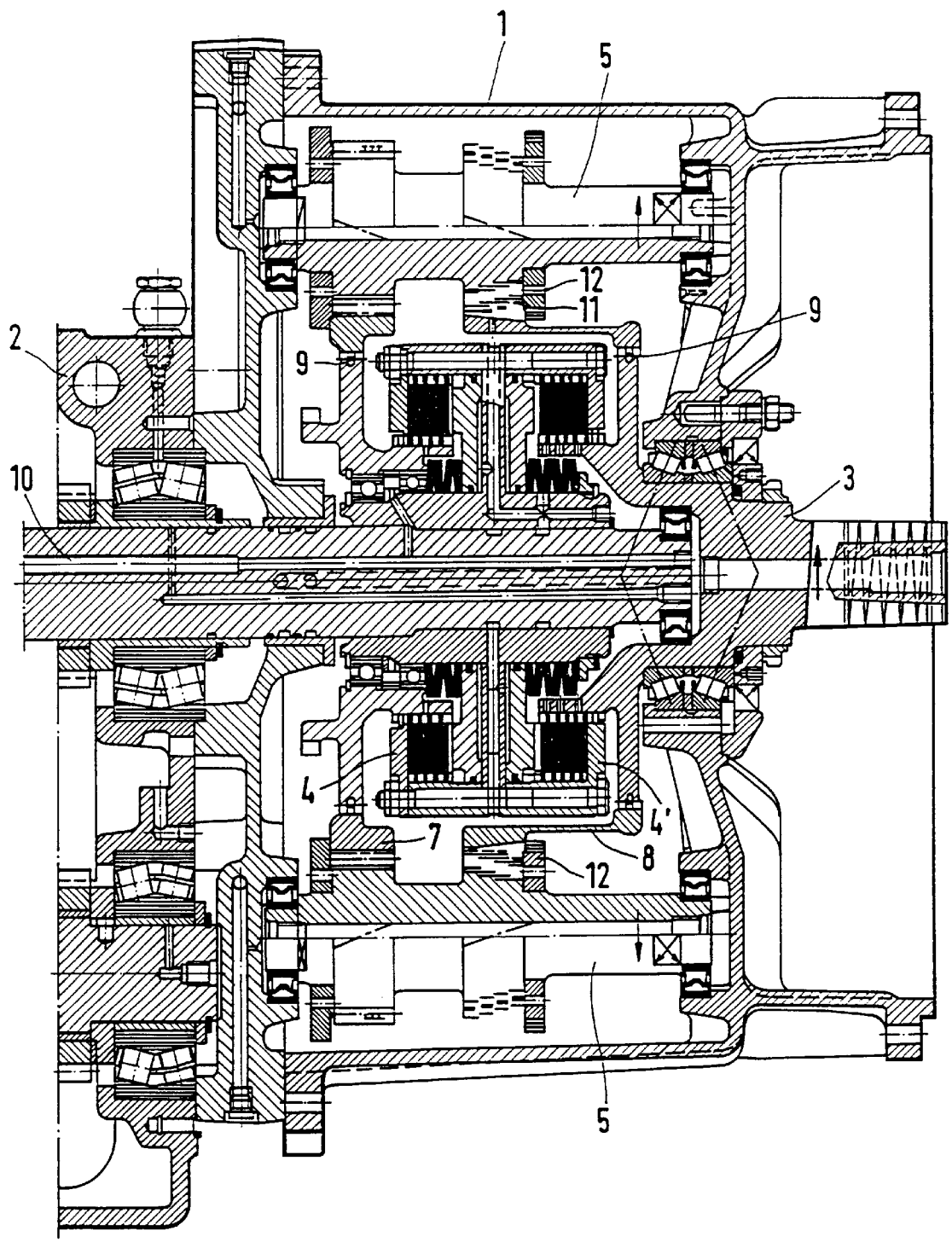
FIG. 4 is a cross-sectional representation of the front-mounted transmission according to a third variant of the instant invention.

This situation is shown in FIG. 3: Due to the opposite orientation of the countershafts 5 and to an adequate assembly of the parts 7 and 8, and of the clutch and free-wheel devices 4 and 7, a ratio 1/i is obtained.

To this end, the stepping-up parts 7, 8, by means of a plug-in system 9, can be plugged and fixed respectively on the shaft 3 driven by the motor and the main shaft 10 of the basic transmission 2.

The selection of the power shift can also be implemented without free wheel by using two regulated multi-disc clutches 4, 4'. This is illustrated in FIG. 5: via the multi-disc clutch 4', it is possible to completely shift to the basic transmission while, via the clutch 4, the power is distributed to the countershafts 5. The ratio obtained by the reproduced construction can be changed without much expenditure: to this end, the stepping-up parts are differently mounted, as explained already, whereby it is possible to achieve a ratio reciprocal to the initial one.

Although a two-speed transmission has been described, multi-speed transmissions are also conceivable by means of the front-mounted construction of the transmission that has been described. The invention Is not confined to a multi-speed boat transmission which has a separate basic transmission. A housing can be provided which comprises all ratio steps including those of the basic transmission. Depending on the kind of propulsion or total ratio required, a basic transmission can be entirely omitted. For this purpose, only the shaft connections have to be adapted. FIG. 3 shows such a transmission.

REFERENCE NUMERALS 1 front-mounted transmission
2 basic transmission
3 shaft
4 clutch
5 countershaft
6 free wheel
7 stepping-up part
8 stepping-up part, flexible connecting element
9 plug-in system
10 main shaft
11 pressure cam
12 helical-cut toothing

What is claimed is:

1. A multi-speed boat transmission for a propeller system to transmit a power from a motor to one of a fixed propeller and a water jet, the multi-speed boat transmission comprising:

a drive shaft (3) for supplying driving power from a motor to the multi-speed boat transmission;

at least two countershafts (5) distributed around a periphery of a main shaft (10) and the driving shaft (3); and at least two stepping-up parts (7, 8, 12);

wherein the at least two countershafts (5) and the at least two stepping-up parts (7, 8) have 9 first mountable orientation in which the at least two stepping-up parts (7, 8) generate a first ratio, and the at least two countershafts (5) and the at least two stepping-up parts (7, 8) have a second mountable orientation, which is opposite to the first mountable orientation, in which the at least two stepping-up parts (7, 8) generate a second ratio that is different from the first ratio.

2. The multi-speed boat transmission according to claim 1, wherein the at least two stepping-up parts (7, 8) comprise a plug-in system and the plug-in system is removably fixed to both the drive shaft (3) and the main shaft (10).

3. The multi-speed boat transmission according to claim 1, wherein each of the at least two countershafts (5) and the at least two stepping-up parts (7, 8) have helically cut teeth (12) with helix angles coordinated to cancel out axial forces generated by each of the at least two countershafts (5) and the at least two stepping-up parts (7, 8) during operation of the multi-speed boat transmission.

4. The multi-speed boat transmission according to claim 1, wherein the multi-speed boat transmission further comprises a first clutch (4') and a second clutch (4) and, upon actuation of the first clutch (4'), direct drive to the main shaft (10) is achieved and, upon actuation of the second clutch (4), power is branched off from the drive shaft (3), via the countershafts (5), in order to achieve one of the first and the second ratios.

5. The multi-speed boat transmission according to claim 1, wherein the multi-speed boat transmission further comprises a clutch (4) and a free wheel (6), wherein, upon actuation of the clutch (4), direct drive to the main shaft (10) is achieved and, upon operation of the free wheel (6), the power is branched off via the countershafts (5) and load is automatically taken up mechanically.

6. The multi-speed boat transmission according to claim 1, wherein the multi-speed boat transmission comprises a two-speed transmission.

7. The multi-speed boat transmission according to claim 1, wherein the multi-speed boat transmission comprises a separate front-mounted transmission (1) mounted to a basic transmission (2).

8. A multi-speed boat transmission for a propeller system to transmit a power from a motor to one of a fixed propeller and a water jet, the multi-speed boat transmission comprising:
- a drive shaft (3) for supplying driving power from a motor to the multi-speed boat transmission;
- at least two countershafts (5) distributed around a periphery of a main shaft (10) and the driving shaft (3); and
- at least two stepping-up parts (7, 8, 12);
- wherein each of the at least two countershafts (5) and the at least two stepping-up parts (7, 8) have helically cut teeth (12), the at least two countershafts (5) are distributed around the periphery of the main shaft (10) and a pair of pressure cams (11) are supported by each one of the at least two countershafts (5) to keep the main shaft (10) free of axial forces.

9. The multi-speed boat transmission according to claim 8, wherein helically But teeth (12) of the at least two countershafts (5) and the at least two stepping-up parts (7, 8) have helix angles coordinated to cancel out axial forces generated by the at least two countershafts (5) and the at least two stepping-up parts (7, 8),during operation of the multi-speed boat transmission.

10. The multi-speed boat transmission according to claim 8, wherein the multi-speed boat transmission further comprises a first clutch (4') and a second clutch (4) and, upon actuation of the first clutch (4'), direct drive to the main shaft (10) is achieved and, upon actuation of the second clutch (4), power is branched off from the drive shaft (3), via the countershafts (5), in order to achieve another ratio.

11. The multi-speed boat transmission according to claim 8, wherein the multi-speed boat transmission further comprises a clutch (4) and a free wheel (6), wherein, upon actuation of the clutch (4), direct drive to the main shaft (10) is achieved and, upon operation of the free wheel (6), the power is branched off via the countershafts (5) and load is automatically taken up mechanically.

12. The multi-speed boat transmission according to claim 8, wherein the multi-speed boat transmission comprises a two-speed transmission.

13. The multi-speed boat transmission according to claim 8, wherein the multi-speed boat transmission comprises a separate front-mounted transmission (1) mounted to a basic transmission (2).

14. A multi-speed boat transmission for a propeller system to transmit power from a motor to one of a fixed propeller and a water jet, the multi-speed boat transmission comprising:
- at least two countershafts (5) distributed around a periphery of a main shaft (10); and
- at least two stepping-up parts (7, 8, 12);
- wherein each of the at least two countershafts (5) and the at least two stepping-up parts (7) have helically cut teeth (12),
- one (8) of the at least two stepping-up parts (7, 8) is a flexible annular connecting element, the flexible annular connecting element has a first end meshing with the toothing of the at least two countershafts (5) and a second end meshing with toothing of one of the main shaft (10) and a drive shaft (3), and the flexible annular connecting element has a flexible area provided between the first and second ends.

15. The multi-speed boat transmission according to claim 14, wherein the flexible area is a segment which has a reduced wall thickness compared to a wall thickness of the first end and the second end of the flexible annular connecting element.

16. The multi-speed boat transmission according to claim 14, wherein helically cut teeth (12) of the at least two countershafts (5) and the at least two stepping-up parts (7, 8) have helix angles coordinated to cancel out axial forces generated by the at least two countershafts (5) and the at least two stepping-up parts (7, 8) during operation of the multi-speed boat transmission.

17. The multi-speed boat transmission according to claim 14, wherein the multi-speed boat transmission further comprises a first clutch (4')and a second clutch (4) and, upon actuation of the first clutch (4'), direct drive to the main shaft (10) is achieved and, upon actuation of the second clutch (4), power is branched off from the drive shaft (3), via the countershafts (5), in order to achieve another ratio.

18. The multi-speed boat transmission according to claim 14, wherein the multi-speed boat transmission further comprises a clutch (4) and a free wheel (6), wherein, upon actuation of the clutch (4), direct drive to the main shaft (10) is achieved and, upon operation of the free wheel (6), the power is branched off via the countershafts (5) and load is automatically taken up mechanically.

19. The multi-speed boat transmission according to claim 14, wherein the multi-speed boat transmission comprises a two-speed transmission.

20. The multi-speed boat transmission according to claim 14, wherein the multi-speed boat transmission comprises a separate front-mounted transmission (1) mounted to a basic transmission (2).

* * * * *